INVENTOR
Bernard E. Lenehan
BY R. L. Freedman
ATTORNEY

United States Patent Office 3,148,329
Patented Sept. 8, 1964

3,148,329
QUANTITY MEASURING APPARATUS USING A PULSE RECORDER

Bernard E. Lenehan, Bloomfield, N.J., assignor to Westinghouse Electric Corporation, East Pittsburgh, Pa., a corporation of Pennsylvania Filed June 19, 1958, Ser. No. 743,149
5 Claims. (Cl. 324—113)

This invention relates to the recording of pulses and has particular relation to a measuring device for producing magnetic records showing the relation of a measured quantity to time.

In many fields it is desirable to provide a record of a measured quantity which shows the relationship of this measured quantity to time. For example, a study of the load distribution and consumption on electrical distribution systems requires a measuring device which measures a function of electric power supplied through the electrical distribution system and constructs a record showing the relationship of this measurement to time.

In the solution disclosed in the patent application of J. M. Wallace et al., Serial No. 619,584, now abandoned, filed October 31, 1956, and assigned to the same assignee, time information and measured information are magnetically recorded. As disclosed by Wallace et al., a magnetic tape is fed past a magnetic recording station at which a magnetic records can be formed in the magnetic tape. A common motor feeds the magnetic tape past the recording station and supplies time information to the station.

A sharp and clear record is desirable in the magnetic tape. The problem of producing such a record is complicated by the fact that the magnetic tape is moved very slowly past the magnetic recording station. For example, this movement may be of the order of ⅙ of an inch per minute.

In accordance with the invention, a substantial signal quantity is stored during an interval between two successive bits of information to be recorded in the magnetic tape. When a bit of information is to be recorded, the stored signal quantity is supplied to the magnetic recording station in the form of a sharp, definite pulse.

In a preferred embodiment of the invention, an electrical capacitor is employed for the purpose of receiving the signal quantity in the form of a charge to be stored. When a pulse is to be supplied to the magnetic recording station, the capacitor is coupled to the station and is discharged through such station.

It is therefore an object of this invention to provide an improved system for recording pulse signals in a moving magnetic element.

It is a further object of the invention to provide a system for producing a magnetic record in a moving magnetic element wherein a signal quantity is stored and thereafter discharged to produce a record in the magnetic element.

It is an additional object of the invention to provide an improved system for producing a magnetic record in a moving magnetic element wherein an electrical charge is stored in a capacitior and thereafter discharged for the purpose of producing a magnetic record in the magnetic element.

It is also an object of the invention to provide an improved method for recording impulses in a magnetic element.

Other objects of the invention will be apparent from the following description taken in conjunction with the accompanying drawing in which.

Figures 1, 2:
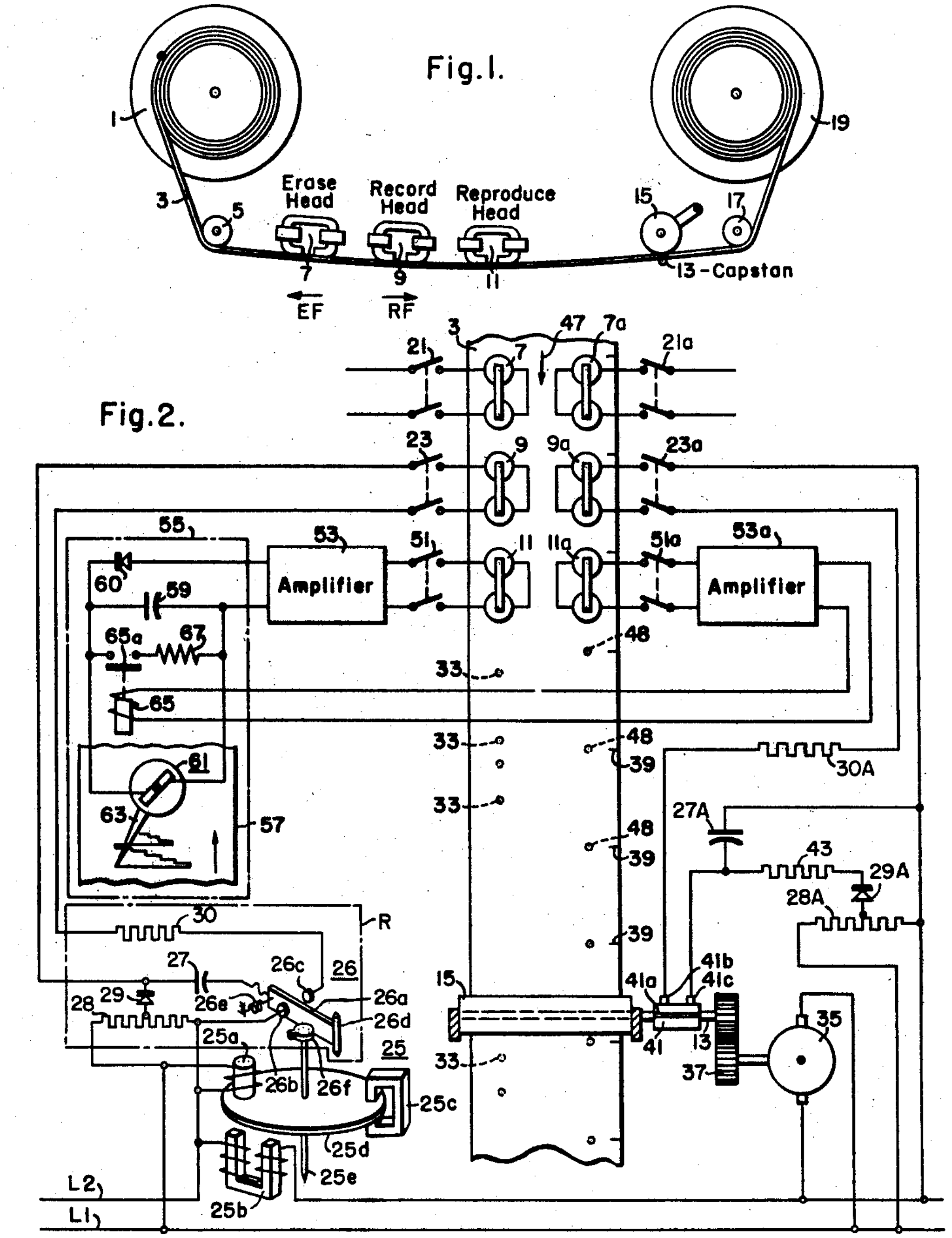
FIGURE 1 is a schematic view of a magnetic recorder suitable for the invention.
FIG. 2 is a schematic view showing a portion of the recorder of FIG. 1 associated with components for supplying information thereto and components for utilizing information therefrom.

Referring to the drawing, FIG. 1 shows a magnetic recorder which may be of conventional construction. The recorder illustrated in FIG. 1 includes a payout reel 1 on which a flexible elongated magnetic member 3 may be wound. The magnetic member 3 may be of any suitable material capable of receiving and retaining a magnetic record therein. It may take the form of a flexible ribbon of magnetically-hard steel, but preferably it is in the form of a magnetic tape having a base constructed of a material such as paper or a plastic. The base is coated with a thin coating of magnetically-hard material. Such tapes are well known in the art.

The magnetic tape leaving the payout reel is guided in a predetermined path by means of a guide roller 5, an erase head 7, a record head 9, a reproduce head 11, a capstan 13 against which the tape is biased by means of a suitable biasing roller 15, and a guide roller 17 to a takeup reel 19. It will be understood that the various reels and rollers are mounted on a suitable supporting structure (not shown) for rotation about their respective axes.

In a preferred embodiment of the invention, the erase head 7 comprises a magnet for establishing a constant magnetic field in the path through which the magnetic tape moves. This field is designed to magnetize the magnetic tape to saturation in one direction and thus "erases" any magnetic record in the tape. The magnet may be either a permanent magnet or an electromagnet energized from a source of direct current.

The erase head 7, alternatively may comprise an electromagnet which when energized establishes a magnetic field in the path through which the magnetic tape 3 passes. Thus in one type of conventional magnetic recorder the erase head has its windings energized from an alternating source of current which may have a frequency of the order of 30,000 cycles per second. When the magnetic tape passes through the field produced by the erase head, any magnetic record previously applied to the tape is removed by the field.

The record head 9 is in the form of an electromagnet for establishing a magnetic field in the path through which the magnetic tape moves. The windings of the electromagnet are energized in accordance with a quantity to be measured.

The reproduce head 11 is illustrated as another electromagnet similar to the record head. If the magnetic tape has a magnetic record therein, the movement of the tape past the reproduce head induces a voltage in the windings of the reproduce head which is representative of the magnetic record carried by the tape. The output of the windings may be supplied to suitable translating means in the manner hereinafter set forth.

The number of heads or electromagnets may be reduced by utilizing one of the heads for more than one function. For example, the record head also may be employed for reproduction purposes.

The capstan 13 is rotated at a substantially uniform rate for the purpose of advancing the magnetic tape past the heads at a substantially uniform rate. The takeup reel 19 is biased to take up the magnetic tape as it is fed by the capstan.

The structure illustrated in FIG. 1 may be based on a magnetic recorder of conventional construction. For example, a magnetic recorder is discussed in a book entitled "Sound Recording," by John G. Frayne and Halley Wolfe, published by John Wiley & Sons, Inc., of New York city in 1949.

After the magnetic tape is fully wound on the takeup reel with a record therein, it may be rewound on the payout reel in a manner well understood in the art. The rewound magnetic tape then may be fed for a second time past the heads for the purpose of reproducing the record formed therein or if desired, the magnetic tape may be removed for storage purposes. During the rewind and playback operations the magnetic tape should be moved through a path spaced from the erase head or the erase head should be deenergized to prevent an erasing operation thereof. The rewind and playback speeds preferably are much faster than the recording speed of the magnetic tape.

FIG. 2 shows a portion of the magnetic tape 3 together with the erase head 7, the record head 9 and the reproduced head 11. The erase head 7, if of the electromagnet type, may be connected through a suitable two-pole single-throw switch 21 to a direct-voltage source. As previously pointed out, the erase head also may be a permanent magnet for saturating the magnetic tape in a predetermined direction. The magnetic field produced by the erase head may pass through the magnetic tape in the direction of the arrow EF.

The record head 9 may be connected through a two-pole single-throw switch 23 to a measuring unit 25 having an output representative of the quantity to be measured.

In a preferred embodiment of the invention, the unit 25 is responsive to power flowing in an electrical circuit represented by conductors L1 and L2. For example, this circuit may be a single-phase alternating-current circuit operating at a frequency of 60 cycles per second for the purpose of supplying power from a generator to a load. The unit 25 has a stator which includes an electromagnet providing a voltage pole 25*a* having a winding connected for energization in accordance with the voltage across the conductors L1 and L2. Current poles 25*b* are provided with windings connected for energization in accordance with current flowing in the conductor L2. A permanent magnet 25*c* also forms part of the stator.

The unit 25 also includes a rotor represented by an electroconductive armature or disc 25*d* which is mounted for rotation relative to the stator on a shaft 25*e*. The armature 25*d* is positioned in the air gap of the electromagnet formed by the poles 25*a* and 25*b* and in the air gap of the permanent magnet 25*c*. The unit 25 thus takes the form of a conventional watthour meter and the rotor rotates at a rate dependent upon power flowing in the conductors L1 and L2.

The rotation of the shaft 25*e* is utilized to produce pulses occurring at a frequency dependent on the rate of rotation of the shaft. To this end a double-throw switch 26 is provided which includes a movable contact 26*a* and two fixed contacts 26*b* and 26*c*. The movable contact 26*a* is mounted on a shaft 26*d* for rotation relative to the fixed contacts about the axis of the shaft by suitable bearing means, not shown. On a first throw of the movable contact 26*a*, the movable contact engages the fixed contact 26*b* and is biased into such engagement by suitable means such as a spring 26*e*.

The movable contact 26*a* on its second throw engages the fixed contact 26*c* and is moved into such engagement by means of a suitable cam 26*f* which is mounted on the shaft 25*e* for rotation therewith. The cam 26*f* may be constructed of insulating material in the shape of a disc having a small protuberance positioned to engage the movable contact 26*a* for the purpose of moving the contact 26*a* into engagement with the fixed contact 26*c*. Such engagement takes place during a very small fraction of each revolution of the shaft 25*e*.

When the movable contact 26*a* engages the fixed contact 26*b*, it connects a capacitor 27 to a suitable source of direct voltage for the purpose of charging the capacitor. In the embodiment of FIG. 2, the source of direct voltage includes a resistor 28 which is connected across the conductors L1 and L2 and it includes a rectifier 29. By inspection of FIG. 2 it will be noted that engagement of the contacts 26*a* and 26*b* connects the capacitor 27 through the rectifier 29 across a portion of the resistor 28. This applies an electrical charge to the capacitor 27 having a value dependent on the size of the capacitor and the magnitude of the voltage applied to the capacitor from the resistor 28.

When the movable contact 26*a* moves from engagement with the fixed contact 26*b* into engagement with the fixed contact 26*c*, it interrupts the charging circuit for the capacitor 27 and connects the capacitor 27 to the record head 9 for the purpose of applying a sharp definite pulse to the record head. In a preferred embodiment of the invention a resistor 30 is included in this circuit. The resistor 30, if employed, preferably has a value sufficiently large to prevent oscillation as a result of the discharge of the capacitor 27. However, the value of the resistor should be low enough to insure a short pulse to the record head 9.

In operation, the shaft 25*e* and the cam 26*f* rotate in accordance with power supplied over the conductors L1 and L2. With the switch in the position illustrated, the capacitor 27 is connected through the rectifier 29 across a portion of the resistor 28 and receives a definite charge. It will be understood that the voltage usually encountered across the conductors L1 and L2 is a substantially constant voltage. However, if a variable voltage is encountered in practice, the capacitor 27 may be connected to any suitable source of constant voltage to receive a definite charge therefrom.

As power continues to be supplied over the conductors L1 and L2, the shaft 25*e* and the cam 26*f* rotate until the cam proturberance engages the movable contact 26*a* to move the contact away from the fixed contact 26*b*. This interrupts the charging circuit for the capacitor 27. The cam then moves the movable contact 26*a* into engagement with the fixed contact 26*c* to connect the capacitor 27 through the resistor 30 to the record head 9. This applies a sharp readily-intelligible pulse to the magnetic tape preferably having a magnitude sufficient to saturate the tape. Continued rotation of the shaft 25*e* and the cam 26*f* returns the movable contact 26*a* into engagement with the fixed contact 26*b* in preparation for another cycle of operation.

From the foregoing discussion it is clear that as the shaft 25*e* rotates, pulses are applied to the record head 9. Each of the pulses is magnetically recorded in the magnetic tape 3. Although such pulses are invisible to the eye, positions of representative pulses 33 are illustrated in FIG. 2. The spacing of the pulses depends substantially on the rate at which power is supplied by the conductors L1 and L2.

If the magnetic tape 3 is premagnetized to saturation in the direction represented by the arrow EF by the erase head 7, the opposite polarity of magnetization represented by the arrow RF is applied by the record head 9. That is, each discharge of the capacitor preferably swings a point on the magnetic tape from saturation in one direction to saturation in the opposite direction. This materially increases the output available in the magnetic tape 3 from the pulses 33.

In order to feed the magnetic tape 3 past the heads, the capstan 13 is coupled to a motive device such as an electric motor 35 through suitable coupling means 37. The electric motor 35 when energized is designed to operate at a substantially constant speed and may take the form of a conventional synchronous motor. By providing a suitable speed reduction in the coupling 37 the motor 35 may be of a reasonably high-speed type.

If the capstan 13 advances the magnetic tape 3 at a positively uniform rate, it follows that the tape may be provided with markings 39 representative of time. However, such precisely uniform movement of the tape is difficult to achieve with flexible magnetic tapes in a practical manner.

Timing signals are generated which are magnetically recorded in the magnetic tape 3. This eliminates the need for moving the magnetic tape in an absolutely uniform manner. If the type of timing signal adopted is such that the output of its magnetic record may be readily segregated from the magnetic record of the pulses supplied through the amplifier 29, as by suitable filters or discriminators, the timing signals may be applied to the magnetic head 9 to be recorded in a single track with the pulses supplied by the amplifier 29. However, in a preferred embodiment of the invention a separate set of heads 7*a*, 9*a* and 11*a* are provided which correspond respectively to the heads 7, 9 and 11, but which apply a record to the magnetic tape lying in a track parallel to and spaced from the track containing the record represented by the pulse positions 33.

The heads 7*a*, 9*a* and 11*a* may be spaced along the magnetic tape 3 from the heads 7, 9 and 11. This permits the adoption of a narrower magnetic tape with adequate mechanical room for the heads. However, it will be assumed that the pairs of heads 7 and 7*a*, 9 and 9*a* and 11 and 11*a* are side by side.

The record head 9*a* may be energized through the switch 23*a* from any source capable of producing periodic pulses representative of time. In FIG. 2, the synchronous motor 35 employed for operating the capstan 13 also is employed for generating the timing signals. For example, the capstan 13 may rotate a cam similar to the cam 26*f* for the purpose of controlling the charging of a capacitor and the discharging of said capacitor into the record head 9*a* in the same manner by which the capacitor 27 is charged and discharged into the record head 9.

In the embodiment of FIG. 2, a commutator 41 is mounted on the capstan 13 for rotation therewith. This commutator has a conductive bar 41*a*. Two brushes 41*b* and 41*c* engage the commutator and are briefly connected by the bar 41*a* once for each rotation of the capstan 13. The brushes periodically connect a capacitor 27A to the record head 9*a* through a resistor 30A and the switch 23*a*. The capacitor 27A is charged through a resistor 43, a rectifier 29A and a voltage divider 28A connected across the conductors L1 and L2. The charging circuit for the capacitor limits the charging current to a value insufficient to produce a record in the magnetic tape 3. For example, the resistance of the charging circuit may be of the order of 2.2 megohms, the capacitor 27A may have a capacitance of 0.1 microfarad and the resistor 30A may have a resistance of 22,000 ohms. Since the commutator 41 completes the discharge circuit only briefly during each rotation of the capstan, and a large fraction of each rotation is available for charging, the low charging rate is adequate. From the foregoing discussion it is clear that if the magnetic tape 3 is moved by the capstan 13 in the direction shown by the arrow 47, and if the switch 23*a* is closed, a series of pulses will be recorded in the magnetic tape 3. Although these pulses are invisible to the eye, their positions are represented in FIG. 2 by points 48. It will be understood that each pair of successive points represents a definite period of time.

To illustrate suitable parameters for the various components, the magnetic tape may be of conventional construction having a width of ¼ inch. It may be moved past the recording heads at the rate of 2.35 inches for each rotation of the capstan 13. If the capstan is rotated once in each 15 minute interval, it follows that each pair of successive points 48 represents an interval of 15 minutes. With the parameters thus far discussed, a tape having a length of 600 feet is adequate for operation for a period of one month. If the voltage across the portion of the resistor 28 (or 28A) employed for charging the capacitor 27 (or 27A) is of the order of 70 volts, as previously pointed out the capacitor may have a capacitance of the order of 0.1 microfarad, and a resistor 30 having a resistance of the order of 22,000 ohms may be employed with a conventional record head 9.

In operation the magnetic recorder may be connected to the circuit represented by the conductors L1 and L2. After it has been placed in operation it may be left untouched for a period of one month. At the end of this period the magnetic tape may be removed for storage purposes or study and another magnetic tape may be loaded on the payout reel to permit operation for a succeeding month at the same location or at a different location as desired.

It is believed that a review of the operation of the magnetic recorder at this point will be helpful. If it is desired to study the consumption of electrical energy in the system represented by the conductors L1 and L2, a full reel 1 of magnetic tape 3 is mounted on the magnetic recorder and the free end of the magnetic tape is threaded through the recorder as illustrated in FIG. 1 to the takeup reel 19. The switches 21, 21*a*, 23, 23*a*, are closed, the unit 25 is connected as illustrated and the motor 35 also is connected for energization.

As the magnetic tape 3 passes the erase head it is subjected to a magnetic field producing magnetic flux passing through the magnetic tape in the direction of the arrow EF. This magnetic field is sufficient to continuously saturate the magnetic tape in a direction corresponding to the arrow EF.

With the parts in the positions illustrated in FIG. 2, the capacitor 27 is connected across a portion of the voltage divider 28 through the rectifier 29, the movable contact 26*a* and the fixed contact 26*b*. Consequently, the capacitor 27 is charged.

At the same time, the capacitor 27A is connected across a portion of the voltage divider 28A through the resistor 43 and the rectifier 29A. Consequently, this capacitor also is charged.

It will be assumed that electrical energy is being transmitted over the conductors L1 and L2 and that the armature 25*d* rotates until the protuberance of the cam 26*f* moves the movable contact 26*a* away from the fixed contact 26*b*. This interrupts the charging circuit for the capacitor 27, but this capacitor now is fully charged.

The rotation of the cam 26*f* forces the movable contact 26*a* into engagement with the fixed contact 26*c* to connect the capacitor 27 across the record head 9 through the resistor 30 and the switch 23. The resulting discharge of the capacitor produces a magnetic field passing through the magnetic tape 3 in the direction of the arrow RF of FIG. 1. Inasmuch as the magnetic tape previously was magnetized to saturation in the direction of the arrow EF it follows that the record head now reverses the magnetization of the magnetic tape for that portion of the tape which is adjacent the record head at the time of discharge of the capacitor 27. The reversal in magnetization of the tape produces a record represented by one of the pulse positions 33. As previously pointed out, the discharge of the capacitor preferably is sufficient to saturate the magnetic tape in a direction corresponding to the arrow RF.

As energy continues to be supplied by the conductors L1 and L2 the cam 26*f* moves its protuberance away from the movable contact 26*a* and the movable contact in turn moves away from the fixed contact 26*c* to interrupt the discharge circuit for the capacitor 27. The movable contact promptly reengages the fixed contact 26*b* to restore the charging circuit for the capacitor 27 and this capacitor now is charged in preparation for another cycle of operation. In this way, a series of pulses 33 are recorded in the magnetic tape 3 to represent the consumption of electrical energy by the system represented by the conductors L1 and L2.

As the motor 35 operates to move the magnetic tape 3 the commutator 41 rotates until the bar 41*a* connects the brushes 41*b* and 41*c* to complete a discharge circuit for the capacitor 27A. This discharge circuit is completed through the resistor 30A and the switch 23a to the record head 9a. The magnetic tape previously had been magnetized to saturation in one direction by the erase head 7a. The discharge of the capacitor 27A through the record head 9a magnetizes the magnetic tape to saturation in the opposite direction to produce a record represented by one of the points 48. Although the charging circuit for the capacitor 27A is continuously maintained the current supplied by the charging circuit is too small to produce an effective magnetization of the magnetic tape. Consequently, if the capacitor 27A is completely discharged before the bar 41a leaves the brushes 41b and 41c the charging current does not affect the size of the point 48.

Continued operation of the motor 35 moves the bar 41a away from the brushes 41b and 41c to interrupt the discharge circuit for the capacitor 27A. The capacitor now receives a charge in preparation for another cycle of operation. Since the time available for charge is much greater than the time required for the discharge of the capacitor 27A, the small charging current suffices to restore the charge of the capacitor 27A before another discharge takes place.

In this way pulses 33 and 48 are applied to the magnetic tape to establish records of energy consumption with respect to time until the entire magnetic tape has been received by the takeup reel 19. The full takeup reel then may be removed for storage processes or for playback on other equipment. Alternatively, the magnetic tape may be rewound on the reel 1 for playback in the magnetic recorder of FIG. 1. However, if the magnetic tape is rewound on the reel 1, it should be spaced from the erase heads 7 and 7a during the rewinding operation and during playback or the erase heads should be deenergized to prevent erasing operations thereof. A playback operation of the magnetic tape will be discussed below. In rewinding and playback operations the speed of the magnetic tape preferably is much faster than the speed of the tape during recording.

Figure 3:
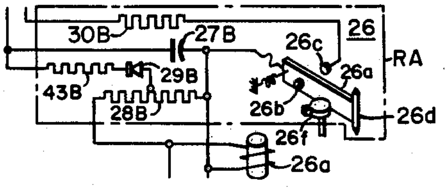
FIG. 3 is a schematic view illustrating a further embodiment of the invention.

In FIG. 2, a double-throw switch 26 is employed for alternately establishing charge and discharge circuits for the capacitor 27. In a preferred embodiment of the invention, a single-throw switch is employed for controlling the capacitor 27 and such a switch is illustrated in FIG. 3. The circuits enclosed in the dotted rectangle RA of FIG. 3 are designed to replace the circuits enclosed in the dotted rectangle R of FIG. 2, the equipment of FIG. 2 being otherwise unchanged.

By inspection of FIG. 3, it will be noted that the switch 26 and its operating cam 26f are reproduced. However, the fixed contact 26b is disconnected and only the fixed contact 26c is employed in the embodiment of FIG. 3 for circuit-controlling purposes. In FIG. 3 a capacitor 27B is permanently connected across a portion of a voltage divider 28B through a resistor 43B and a rectifier 29B. These four components are similar respectively to the capacitor 27A, the voltage divider 28A, the resistor 43 and the rectifier 29A of FIG. 2. When the movable contact 26a engages the fixed contact 26c, it connects the capacitor 27B through a resistor 30B and the switch 23 across the record head 9 to discharge the capacitor through the record head. The resistor 30B is similar to the resistor 30A of FIG. 2.

In the embodiment of FIG. 3, the charging circuit for the capacitor 27B is continuously in complete condition. However, the resistance of the charging circuit is so great that the magnitude of the charging current if applied directly to the record head is insufficient to produce a magnetic record in the magnetic tape 3.

Although the magnetic tape may be run through a separate reproducing unit, it will be assumed that it is run through the same mechanism for reproduction purposes. To this end the switches 51 and 51a may be closed to connect the reproduce heads 11 and 11a respectively to the amplifiers 53 and 53a. The outputs of the amplifiers may be connected to any suitable translating equipment. In actual practice the outputs of the amplifiers would be supplied to a business machine 55 of conventional construction for the purpose of transferring the information of the magnetic records stored in the magnetic tape 3 to cards in punched or printed form. Once the information has been transferred to cards, the magnetic tape 3 may be demagnetized for further use if so desired.

In order to simplify the present discussion, it will be assumed that the machine 55 is in the form of a recorder for applying to a chart 57 the information stored in the magnetic tape 3. To this end a capacitor 59 is connected across the output terminals of the amplifier 53. Consequently, each of the pulses 33 applied to the capacitor 59 through the amplifier 53 increases the charge on the capacitor and the voltage across the capacitor. If an alternating pulse is provided by the amplifier 53, a rectifier 60 may be connected in series with the capacitor 59 to supply unidirectional current to the capacitor. This voltage across the capacitor is measured by a suitable measuring device which is represented as a permanent-magnet moving-coil instrument 61 having a pen 63 mounted for movement across the chart 57.

The output of the amplifier 53a is supplied to a relay 65 having make contacts 65a which are connected in series with a resistor 67 across the capacitor 59.

Let it be assumed that as the magnetic tape moves along its appointed path one of the points 48 passes the reproduce head 11a. The resultant pickup of the reproduce head produces a pulse which is applied through the amplifier 53a to the relay 65 for the purpose of discharging the capacitor 59. Consequently, the pen 63 moves to its zero position. During the next time interval each successive point 33 builds up a charge on the capacitor and increases the voltage across the capacitor. As the voltage increases, the instrument 61 moves the pen 63 across the face of the chart 57 to record a line representative of the voltage across the capacitor 59 and the demand occurring in the interval between successive points 48. When the next point 48 reaches the reproduce head 11a, the pen 63 again is reset to its zero position. It will be understood that the chart 57 is moved continuously. Consequently, a series of lines are produced on the chart 57 each of which represents the demand occurring during a 15 minute interval. In a practical device a maximum of 250 pulses or points 33 may be produced within a 15-minute interval.

Although the invention has been described with reference to certain specific embodiments thereof, numerous modifications falling within the spirit and scope of the invention are possible.

I claim as my invention:

1. In a measuring device, a magnetic recorder unit for producing magnetic records in a magnetic member, said recorder unit comprising feed means for feeding a magnetic member continuously through a predetermined path, and electroresponsive recording means adjacent said path, said recording means being effective when electrically energized for producing a magnetic record in a magnetic member fed through the path, electroresponsive storage means effective when energized for storing an electrical quantity, terminal means for connection to a source of electrical energy, and control means operable for alternately coupling the storage means to the terminal means to store an electrical quantity and to the recording means to produce a magnetic record in a magnetic member, and measuring means for operating the control means intermittently at a rate dependent on a quantity to be measured.

2. In a measuring device, a magnetic recorder unit for producing magnetic records on a magnetic member, said recorder unit comprising feed means for continuously feeding a magnetic member through a predetermined path, and electroresponsive recording means adjacent said path, said recording means being effective when electrically energized for producing a magnetic record in a magnetic member fed through the path, an electrical capacitor for storing an electrical charge, terminal means for connection to a source of direct voltage, means coupling the capacitor to the terminal means to receive a charge, and measuring means intermittently coupling the capacitor to the recording means at a rate dependent on a quantity being measured to produce a succession of magnetic record pulses in a magnetic member fed by said feeding means at a rate dependent on a quantity being measured by the measuring means.

3. In a measuring device, a magnetic recorder unit for producing magnetic records on a magnetic member, said recorder unit comprising feed means for continuously feeding a magnetic member through a predetermined path, and electroresponsive recording means adjacent said path, said recording means being effective when electrically energized for producing a magnetic record in a magnetic member fed through the path, an electrical capacitor for storing an electrical charge, terminal means for connection to a source of direct voltage, and circuit means including a double-throw switch to couple the capacitor to the terminals to receive a charge for a first throw of the switch and to disconnect the capacitor from the terminals for a second throw of the switch, said circuit means being effective for coupling the capacitor to the recording means to apply a record to the magnetic element for the second throw of the switch and for decoupling the capacitor from the recording means for the first throw of the switch, and measuring means for operating said switch between said throws intermittently at a rate dependent on a quantity to be measured.

4. In a measuring device, a magnetic recorder unit for producing magnetic records on a magnetic member, said recorder unit comprising feed means for continuously feeding a magnetic member through a predetermined path, and electroresponsive recording means adjacent said path, said recording means being effective when electrically energized for producing a magnetic record in a magnetic member fed through the path, an electrical capacitor for storing an electrical charge, terminal means for connection to a source of direct voltage, charging means coupling the capacitor to said terminal means to receive a charge, circuit means including a switch operable between first and second conditions, said switch in the first condition coupling the capacitor to the recording means to apply a record to the magnetic element, the switch in the second condition decoupling the capacitor from the recording means, variable-quantity measuring means for operating the switch between said conditions at a rate dependent on a variable quantity to be measured, and timing means for establishing a time record on the magnetic element.

5. In a measuring device, a magnetic recorder unit for producing magnetic records on a magnetic member, said recorder unit comprising feed means for continuously feeding a magnetic member through a predetermined path, and electroresponsive recording means adjacent said path, said recording means being effective when electrically energized for producing a magnetic record in a magnetic member fed through the path, an electrical capacitor for storing an electrical charge, terminal means for connection to a source of direct voltage, charging means coupling the capacitor to said terminal means to receive a charge, circuit means including a switch operable between first and second conditions, said switch in the first condition coupling the capacitor to the recording means to apply a record to the magnetic element, the switch in the second condition decoupling the capacitor from the recording means, variable-quantity measuring means for operating the switch between said conditions at a rate dependent on a variable quantity to be measured, and timing means for establishing a time record on the magnetic element, said timing means comprising a second capacitor, means coupling the second capacitor to a source of direct current for charging the second capacitor, second electroresponsive recording means adjacent said path for applying a magnetic record to a separate portion of the magnetic member, and time-responsive means for intermittently coupling the second electroresponsive recording means across the second capacitor at a rate dependent on time.

References Cited in the file of this patent

UNITED STATES PATENTS

| | | |
|---|---|---|
| 1,664,243 | Chubb | Mar. 27, 1928 |
| 2,696,420 | Roth | Dec. 7, 1954 |
| 2,698,875 | Greenwood | Jan. 4, 1955 |

FOREIGN PATENTS

| | | |
|---|---|---|
| 489,038 | Great Britain | July 19, 1938 |